United States Patent
Endo et al.

(10) Patent No.: US 11,545,662 B2
(45) Date of Patent: *Jan. 3, 2023

(54) POSITIVE ACTIVE MATERIAL FOR NONAQUEOUS ELECTROLYTE SECONDARY BATTERY, METHOD OF PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

(71) Applicant: GS Yuasa International Ltd., Kyoto (JP)

(72) Inventors: Daisuke Endo, Kyoto (JP); Hiromasa Muramatsu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 179 days.

This patent is subject to a terminal disclaimer.

(21) Appl. No.: 16/771,281

(22) PCT Filed: Dec. 14, 2018

(86) PCT No.: PCT/JP2018/046043
§ 371 (c)(1),
(2) Date: Jun. 10, 2020

(87) PCT Pub. No.: WO2019/117282
PCT Pub. Date: Jun. 20, 2019

(65) Prior Publication Data
US 2020/0381720 A1 Dec. 3, 2020

(30) Foreign Application Priority Data

Dec. 15, 2017 (JP) .............................. JP2017-240406
Dec. 15, 2017 (JP) .............................. JP2017-240407

(51) Int. Cl.
*H01M 4/525* (2010.01)
*H01M 4/04* (2006.01)
(Continued)

(52) U.S. Cl.
CPC ............ *H01M 4/525* (2013.01); *C01G 53/50* (2013.01); *H01M 4/0471* (2013.01);
(Continued)

(58) Field of Classification Search
None
See application file for complete search history.

(56) References Cited

U.S. PATENT DOCUMENTS

2004/0234857 A1  11/2004 Shiozaki et al.
2009/0104530 A1   4/2009 Shizuka et al.
(Continued)

FOREIGN PATENT DOCUMENTS

JP  2001-85006 A   3/2001
JP  2003-229124 A  8/2003
(Continued)

OTHER PUBLICATIONS

Shiozaki et al. (EP 1,447,866) (Abstract, Detailed Description and Drawings) (Dec. 31, 2008) (Year: 2008).*
(Continued)

*Primary Examiner* — Carmen V Lyles-Irving
(74) *Attorney, Agent, or Firm* — Rankin, Hill & Clark LLP

(57) ABSTRACT

Disclosed is a positive active material for a nonaqueous electrolyte secondary battery containing a lithium transition metal composite oxide, in which the lithium transition metal composite oxide has an $\alpha$-NaFeO$_2$ structure, a molar ratio Li/Me of Li and a transition metal (Me) of $1.05 \leq \text{Li/Me} \leq 1.4$, and a porosity of 5 to 15%.

5 Claims, 3 Drawing Sheets

(51) Int. Cl.
  *H01M 4/505* (2010.01)
  *C01G 53/00* (2006.01)
  *H01M 10/0525* (2010.01)
  *H01M 4/02* (2006.01)

(52) U.S. Cl.
  CPC ....... *H01M 4/505* (2013.01); *H01M 10/0525* (2013.01); *C01P 2002/72* (2013.01); *C01P 2006/10* (2013.01); *C01P 2006/40* (2013.01); *H01M 2004/028* (2013.01)

(56) References Cited

U.S. PATENT DOCUMENTS

| | | | |
|---|---|---|---|
| 2010/0233542 | A1 | 9/2010 | Endo et al. |
| 2011/0305955 | A1 | 12/2011 | Song et al. |
| 2014/0004423 | A1 | 1/2014 | Endo et al. |
| 2014/0038053 | A1 | 2/2014 | Endo et al. |
| 2014/0234717 | A1 | 8/2014 | Christensen et al. |
| 2015/0060725 | A1 | 3/2015 | Yamamoto et al. |
| 2015/0221934 | A1 | 8/2015 | Hiratsuka et al. |
| 2016/0028072 | A1 | 1/2016 | Sakai et al. |
| 2016/0056462 | A1 | 2/2016 | Sakai et al. |
| 2016/0099460 | A1 | 4/2016 | Toyama et al. |
| 2017/0346071 | A1 | 11/2017 | Ogata et al. |
| 2018/0048015 | A1* | 2/2018 | Lee ................. H01M 4/525 |
| 2018/0145318 | A1 | 5/2018 | Endo et al. |
| 2018/0366773 | A1 | 12/2018 | Endo et al. |
| 2019/0020023 | A1 | 1/2019 | Yokoyama et al. |
| 2019/0051929 | A1 | 2/2019 | Okada et al. |
| 2021/0249645 | A1* | 8/2021 | Endo ................. H01M 4/131 |

FOREIGN PATENT DOCUMENTS

| | | |
|---|---|---|
| JP | 2006-120529 A | 5/2006 |
| JP | 2008-13405 A | 1/2008 |
| JP | 2009-152114 A | 7/2009 |
| JP | 2010-278015 A | 12/2010 |
| JP | 2011-57518 A | 3/2011 |
| JP | 2011-113792 A | 6/2011 |
| JP | 2012-4109 A | 1/2012 |
| JP | 4877660 B2 | 2/2012 |
| JP | 2013-211239 A | 10/2013 |
| JP | 2014-29828 A | 2/2014 |
| JP | 2014-44928 A | 3/2014 |
| JP | 2014-44945 A | 3/2014 |
| JP | 2014-49410 A | 3/2014 |
| JP | 2014-67546 A | 4/2014 |
| JP | 2014-529868 A | 11/2014 |
| JP | 2015-72800 A | 4/2015 |
| JP | 2015-72801 A | 4/2015 |
| JP | 2015-164119 A | 9/2015 |
| JP | 2015-164123 A | 9/2015 |
| JP | 2016-25041 A | 2/2016 |
| JP | 2016-54101 A | 4/2016 |
| JP | 2016-76470 A | 5/2016 |
| JP | 2016-143447 A | 8/2016 |
| JP | 2016-149258 A | 8/2016 |
| JP | 2017-84628 A | 5/2017 |
| WO | 2003/044881 A1 | 5/2003 |
| WO | 2014/192759 A1 | 12/2014 |
| WO | 2015/108163 A1 | 7/2015 |
| WO | 2016/151983 A1 | 9/2016 |
| WO | 2016/190419 A1 | 12/2016 |
| WO | 2017/104688 A1 | 6/2017 |
| WO | 2018/012385 A1 | 1/2018 |

OTHER PUBLICATIONS

International Search Report (ISR) dated Mar. 19, 2019 issued in PCT/JP2018/046043.

* cited by examiner

POSITIVE ACTIVE MATERIAL FOR NONAQUEOUS ELECTROLYTE SECONDARY BATTERY, METHOD OF PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a positive active material for a nonaqueous electrolyte secondary battery, a method of producing the positive active material, a positive electrode for a nonaqueous electrolyte secondary battery containing the positive active material, and a nonaqueous electrolyte secondary battery including the positive electrode.

BACKGROUND ART

Heretofore, as a positive active material for a nonaqueous electrolyte secondary battery represented by a lithium secondary battery, a "LiMeO$_2$-type" active material (wherein Me is a transition metal) having an α-NaFeO$_2$-type crystal structure has been examined, and lithium secondary batteries including LiCoO$_2$ have been widely put to practical use. However, the discharge capacity of LiCoO$_2$ is about 120 to 130 mAh/g. As the Me, it has been desired to use Mn that is abundant as an earth resource. However, in the "LiMeO$_2$-type" active material containing Mn as Me, there is the problem that when the molar ratio Mn/Me of Mn in Me is more than 0.5, the structure is changed to a spinel type-structure by charge, and thus it is unable to maintain a crystal structure, resulting in very poor charge-discharge cycle performance.

In view of this, various "LiMeO$_2$-type" active materials which are excellent in charge-discharge cycle performance and in which the molar ratio Mn/Me of Mn in Me is 0.5 or less have been proposed, and some of them have been put to practical use. For example, a positive active material containing LiNi$_{1/2}$Mn$_{1/2}$O$_2$ or LiNi$_{1/3}$Mn$_{1/3}$O$_2$ as a lithium transition metal composite oxide has a discharge capacity of 150 to 180 mAh/g.

On the other hand, for the so-called "LiMeO$_2$-type" active material as described above, the so-called "lithium excess type" active material in which a compositional ratio Li/Me of lithium (Li) to a transition metal (Me) is more than 1 and which contains a lithium transition metal composite oxide represented by a compositional formula Li$_{1+\alpha}$Me$_{1-\alpha}$O$_2$ (α>0) is known.

With respect to the "lithium excess type" active material and the "LiMeO$_2$-type" active material, inventions in which porosity is specified are known (for example, see Patent Documents 1 to 7).

Patent Document 1 discloses that "A lithium ion secondary battery comprising: a positive electrode having a positive active material capable of absorbing and releasing lithium ions; a negative electrode having a negative active material capable of absorbing and releasing lithium ions; and a separator for separating the positive electrode and the negative electrode, wherein the positive electrode includes a positive electrode current collector and a positive composite layer formed on the positive electrode current collector and containing the positive active material, the positive active material is a layered solid solution compound, the layered solid solution compound has a porosity of 2% or more and 10% or less in a secondary particle, and the positive composite layer has a porosity of 30% or more and 40% or less". (Claim 1), and "The lithium ion secondary battery according to claim 1, wherein the positive active material is represented by the general formula Li$_x$Mn$_a$Ni$_b$Co$_c$M$_d$O$_2$ (wherein x, a, b, c and d are parameters satisfying 1.1≤x≤1.5, 0.45≤a≤0.6, 0.15≤b≤0.35, 0≤c≤0.35, and 0≤d≤0.4, and M is at least one or more elements selected from Fe, Cr, V, Ti, Cu, Ga, Bi, Sn, B, P, Zn, Mg, Ge, Nb, W, Ta, Be, Al, Ca, Sc, and Zr)". (Claim 7).

Examples 1 to 4 show a positive active material (paragraphs [0025] to [0027]) of a layered solid solution compound produced by a solid phase method and having a composition represented by Li$_{1.45}$Mn$_{0.5533}$Ni$_{0.233}$Co$_{0.233}$O$_2$, and the porosities in a secondary particle are 6%, 2%, 10%, and 15% in the respective examples (see FIGS. 2 and 3). Patent Document 1 describes that "As shown in FIG. 2, in the lithium ion secondary batteries of Examples 1 to 4, as a result, the weight energy density was as large as 167 to 170 Wh/kg, and the DC resistance was as small as 4.0 to 4.2 mΩ as compared with the lithium ion secondary batteries of Comparative Examples 1 to 7". (paragraph [0055]).

Patent Document 2 discloses "A positive active material for a lithium ion battery represented by a composition formula: Li$_x$Ni$_{1-(y+z)}$Mn$_y$Co$_z$O$_{2+\alpha}$ (wherein 0.9≤x≤1.2, 0≤y+z≤0.3, and −0.1≤α≤0.1), having an average particle size D50 of 5 to 7 μm, a particle strength of 60 MPa or more, and an average porosity inside particles having a particle size of 3 μm or more of 5% or less". (Claim 1).

Patent Document 2 describes that "The ratio of lithium to the whole metal in the positive active material for a lithium ion battery is 0.9 to 1.2; and this is because with the ratio of lower than 0.9, a stable crystal structure can hardly be held, and with the ratio exceeding 1.2, a high capacity of the battery cannot be secured". (paragraph [0018]).

Examples show the positive active material in which x: 1.0, Ni: 80%, Mn: 10%, Co: 10%, x: 1.0, Ni: 85%, Mn: 7.5%, Co: 7.5%, x: 1.0, Ni: 85%, Mn: 5%, and Co: 10%, the particle size is 3 μm or more, and the average porosity is 1.2 to 4.9% (see Table 1 in paragraph [0041]).

Patent Document 3 discloses "A positive active material for a nonaqueous electrolyte secondary battery, comprising lithium-nickel composite oxide particles that consist of secondary particles, the secondary particles being each formed by agglomeration of a plurality of primary particles and including pores, have a composition represented by Li$_z$Ni$_{1-x-y}$Co$_x$M$_y$W$_a$O$_{2+\alpha}$ where 0≤x≤0.35; 0≤y≤0.35; 0.95≤z≤1.30; 0≤a≤0.03; 0≤α≤0.15; and M is at least one element selected from Mg, Al, Ca, Ti, V, Cr, Mn, Nb, Zr, and Mo, and have a layered crystal structure, wherein the lithium-nickel composite oxide particles have an average particle size of 15 μm or more and 30 μm or less, the percentage of an area of the pores measured by a cross-sectional observation of the lithium-nickel composite oxide particles with respect to a cross-sectional area of the lithium-nickel composite oxide particles is 1.0% or more and 5.0% or less, a lithium-tungsten compound containing tungsten and lithium is present on the surface of and inside the secondary particles, the lithium-tungsten compound is present on at least part of the surface of the primary particles, and the amount of lithium contained in a lithium compound other than the lithium-tungsten compound present on the surface of the primary particles with respect to the total amount of the lithium-nickel composite oxide particles is 0.05% by mass or less". (Claim 1).

Patent Document 3 describes that "the amount of lithium in the entire positive electrode active material 1 (composite oxide particles 5), Li/Me in the entire positive active material 1, is 0.95 or more and 1.30 or less, preferably 0.97 or more and 1.20 or less, more preferably 0.97 or more and 1.15 or less. Consequently, Li/Me in the secondary particles 4 (core) can be controlled within 0.95 or more and 1.25 or less, preferably 0.95 or more and 1.15 or less, more preferably 0.95 or more and 1.10 or less. If Li/Me in the entire positive active material 1 is less than 0.95, the positive electrode of a nonaqueous electrolyte secondary battery using the obtained positive active material would have a large reaction resistance, which may reduce the power of the battery. Also, if Li/Me in the entire positive active material 1 exceeds 1.30, the initial discharge capacity of the positive active material may be reduced, and the reaction resistance of the positive electrode may be increased". (paragraph [0064]).

Examples show lithium-nickel composite oxide particles (paragraphs [0161] to [0163]) which has been obtained by adding lithium hydroxide to a nickel composite oxide represented by $Ni_{0.91}Co_{0.06}Al_{0.03}O_2$ and firing the mixture and in which the atomic ratio of the atomic number of Li to the sum of the atomic numbers of Ni, Co, and Al was 1.048, and the porosity is 1.2 to 4.2% (see Table 1 in paragraph [0181]).

Patent Document 4 discloses "A lithium-nickel composite oxide for a lithium secondary battery positive active material represented by a composition formula $Li_{x-y}A_yNi_{1-z}M_zO_2$ (A is one or more selected from alkali metals and alkaline earth metals except Li; M is one or more selected from Co, Mn, Cr, Fe, V, and Al; $0<x\le1$; $0\le y\le0.2$; $0<x-y\le1$; $x+y\le1$; and $0\le z\le0.5$), primary particles having an average particle size of 1 μm to 8 μm being agglomerated to form secondary particles having an average particle size of 5 μm to 30 μm, and the secondary particle having a porosity of 30% or less". (Claim 1).

Examples show a lithium nickel composite oxide (paragraphs [0047] to [0049]) represented by a composition formula $LiNi_{0.85}Co_{0.15}O_2$, and the lithium nickel composite oxide has a secondary particle porosity of 5.6% to 23.6% (see Table 1 in paragraph [0059]).

Patent Document 5 discloses "A positive active material for a lithium secondary battery, comprising voids having an average diameter of 10 to 60 nm, and having a porosity of 0.5 to 20%" (Claim 1).

Examples show a lithium metal oxide $LiNi_{0.6}Co_{0.2}Mn_{0.2}O_2$ or $LiNi_{0.5}Co_{0.2}Mn_{0.3}O_2$ (paragraphs [0076] to [0079]) having a porosity of 2.07 to 2.91% (see Table 1 in paragraph [0088]).

Patent Document 6 discloses "A method of producing a positive active material for a lithium ion battery, comprising: providing a hydroxide raw material powder composed of secondary particles in which numerous primary particles having a composition represented by $Ni_{1-y}M_y(OH)_2$ (wherein $0<y\le0.5$, M is at least one or more metal elements selected from the group consisting of Co, Al, Mg, Mn, Ti, Fe, Cr, Zn, and Ga) are agglomerated, at least a part of the primary particles being oriented radially outwardly from the centers of the secondary particles; rapidly increasing a temperature of the hydroxide raw material powder to a maximum ultimate temperature of 500 to 1000° C. at a temperature elevating rate of 50° C./min or more and/or by spray pyrolysis and thermally decomposing the hydroxide raw material powder to generate an oxide powder comprising a crack-shaped open pore; and reacting the oxide powder with a lithium compound alone or a combination of a compound containing a metal element M and a lithium compound so as to provide a composition represented by $Li_xNi_{1-z}M_zO_2$ (wherein $0.96\le x\le1.09$, and $0<z\le0.5$) to obtain a positive active material for a lithium ion battery". (Claim 1) and "The method according to any one of claims 1 to 7, wherein the positive active material comprises substantially spherical secondary particles with a porosity of 5 to 25% by volume in which numerous primary particles are agglomerated, and at least a part of the primary particles and voids are oriented radially outwardly from the centers of the secondary particles". (Claim 8).

Examples show the positive active material composed of $Li_{1.02}(Ni_{0.81}Co_{0.15}Al_{0.04})O_2$, and the porosity is 10 to 22% (see Table 1 in paragraph [0034]). Examples further show the positive active material composed of $Li_{1.02}(Ni_{0.60}Co_{0.20}Mn_{0.20})O_2$, and the porosity is 10 to 25% (see Table 2 in paragraph [0039]).

Patent Document 7 discloses "A positive active material of a lithium secondary battery, having a layered rock salt structure, the positive active material containing secondary particles comprising a large number of primary particles having an average particle size of 0.01 μm or more and 5 μm or less, in the secondary particles, an orientation ratio of (003) planes in secondary particles being 60% or more, an average particle size of the secondary particles being 1 μm or more and 100 μm or less, the secondary particle having an aspect ratio, which is a value obtained by dividing a long axis diameter by a short axis diameter, of 1.0 or more and less than 2, a porosity of the secondary particle being 3% or more and 30% or less, an open pore ratio being 70% or more, an average pore size of the open pores being 0.1 μm or more and 5 μm or less, and a value obtained by dividing the average particle size of the primary particles by the average pore size of the open pores being 0.1 or more and 5 or less". (Claim 1).

Example shows $Li(Ni_{0.8}Co_{0.15}Al_{0.05})O_2$ (paragraph [0125]) having a porosity of 4 to 28% (see Table 2 in paragraph [0133]).

PRIOR ART DOCUMENTS

Patent Documents

Patent Document 1: JP-A-2016-54101
Patent Document 2: JP-A-2016-149258
Patent Document 3: JP-A-2017-84628
Patent Document 4: JP-A-2001-85006
Patent Document 5: JP-A-2012-4109
Patent Document 6: JP-A-2014-49410
Patent Document 7: JP-A-2014-67546

SUMMARY OF THE INVENTION

Problems to be Solved by the Invention

When a positive electrode containing a lithium excess type active material is initially charged up to a potential of 5.0 V (vs. Li/Li$^+$), a region (hereinafter also referred to as "region where the potential change is flat") where a potential change relative to an amount of charge is relatively flat is observed in a positive electrode potential range of 4.5 to 5.0 V (vs. Li/Li$^+$). In the region where the potential change is flat, in a positive electrode which has been subjected to charge and subsequent discharge at least once until the region where the potential change is flat is terminated, the region does not appear again even when charge is performed up to 5.0 V (vs. Li/Li$^+$) after that. A nonaqueous electrolyte secondary battery including a positive electrode containing a lithium excess type active material is produced by charge up to termination of the above-described region where the potential change is flat during initial charge, whereby in the subsequent charge and discharge, a high discharge capacity is obtained even when charge and discharge are performed in a potential region of 4.5 V (vs. Li/Li$^+$) or less.

To confirm this, using lithium metal as the counter electrode, (i) charge and discharge in which an end-of-charge voltage is 4.6 V and an end-of-discharge voltage is 2.0 V and (ii) charge and discharge in which the end-of-charge voltage is 4.45 V and the end-of-discharge voltage is 2.0 V are preferably performed in this order. In the active material of the present invention, a discharge capacity of 200 mAh/g or more is obtained in the discharge of the above (ii). Even if charge and discharge are performed by such a procedure with a so-called LiMeO$_2$-type active material, only a capacity of less than 200 mAh/g can be obtained.

However, a positive electrode containing a conventional lithium excess type active material is produced as described above, and when the positive electrode is used as described above, a difference (hereinafter also referred to as "charge-discharge hysteresis") between a potential profile during charge and a potential profile during discharge is large. Therefore, there is a problem that a ratio of energy (hereinafter referred to as "energy efficiency") obtained during discharge to energy required during charge is small.

Patent Document 1 discloses a "lithium-excess type" positive active material containing a lithium transition metal composite oxide having a molar ratio Li/Me (Me is a transition metal) of 1.45, and the positive active material has a porosity of 2 to 15%. However, Patent Document 1 does not describe improving charge-discharge efficiency and energy efficiency.

Patent Documents 2 and 3 describe a positive active material containing a lithium transition metal composite oxide having a molar ratio Li/Me of 1≤Li/Me. However, the specifically described positive active material is a "LiMeO$_2$-type" positive active material, and the porosity is less than 5%.

Patent Documents 4 to 7 describe "LiMeO$_2$-type" positive active materials having a porosity of 5% or more.

Patent Documents 2 to 7 do not describe improving charge-discharge efficiency and energy efficiency.

It is an object of the present invention to provide a lithium excess type positive active material exhibiting excellent energy efficiency and a nonaqueous electrolyte secondary battery using the positive active material.

Means for Solving the Problems

One aspect of the present invention for solving the above problems includes a positive active material for a nonaqueous electrolyte secondary battery containing a lithium transition metal composite oxide, a positive electrode for a nonaqueous electrolyte secondary battery containing the positive active material, and a nonaqueous electrolyte secondary battery including the positive electrode, in which the lithium transition metal composite oxide has an α-NaFeO$_2$ structure, a molar ratio Li/Me of Li and a transition metal (Me) of 1.05≤Li/Me≤1.4, and a porosity of 5 to 15%.

Another aspect of the present invention is a method of producing a positive active material for a nonaqueous electrolyte secondary battery containing a lithium transition metal composite oxide, including mixing a lithium compound with a transition metal hydroxide precursor and firing the mixture at 750 to 1000° C. to prepare the lithium transition metal composite oxide having an α-NaFeO$_2$ structure, a molar ratio Li/Me of Li and a transition metal (Me) of 1.05≤Li/Me≤1.4, and a porosity of 5 to 15%.

Advantages of the Invention

The present invention can provide a lithium excess type positive active material exhibiting excellent energy efficiency and a nonaqueous electrolyte secondary battery using the positive active material.

MODE FOR CARRYING OUT THE INVENTION

Figure 1:
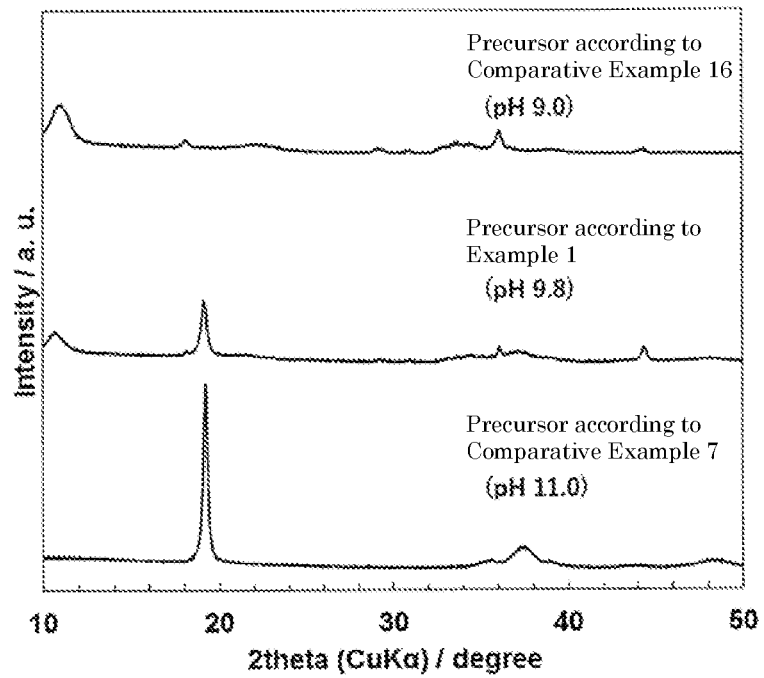
FIG. 1 is an X-ray diffraction diagram of a precursor powder according to Comparative Example 16, a precursor powder according to Example 1, and a precursor powder according to Comparative Example 7.

The present inventors have discovered that a lithium transition metal composite oxide with controlled porosity can be prepared by changing synthesis conditions such as a crystal structure of a precursor and a composition of the lithium transition metal composite oxide as an active material, and have found that when the porosity is in a specific range, a lithium excess type positive active material exhibiting excellent energy efficiency can be obtained.

The reason why the porosity of the lithium excess type positive active material is related to the energy efficiency is not always clear, but the present inventors speculate as follows. The porosity of the lithium excess type positive active material represents an amount of pores present in particles of the active material, and the number of reaction points increases as the porosity becomes high. If the porosity is too high, the number of reaction points becomes too large, so that oxidative decomposition of an electrolyte solution on an active material surface during charge is promoted, resulting in low energy efficiency.

In a lithium excess type which can be regarded as a solid solution of a LiMeO$_2$ phase and a Li$_2$MnO$_3$ phase, if the porosity is too low, a charge-discharge hysteresis derived from the Li$_2$MnO$_3$ phase is likely to be reflected. Since the Li$_2$MnO$_3$ phase has a larger charge-discharge hysteresis than the LiMeO$_2$ phase, if the porosity is too low, the energy efficiency is reduced. Accordingly, when the porosity of the lithium excess type positive active material is in the specific range, the lithium excess type positive active material having a small charge-discharge hysteresis can be provided, and the lithium excess type positive active material capable of providing a nonaqueous electrolyte secondary battery having high energy efficiency can be provided.

Hereinafter, the positive active material, its precursor, and the nonaqueous electrolyte secondary battery will be described in detail.

<Positive Active Material for Nonaqueous Electrolyte Secondary Battery>

A first embodiment of the present invention based on the above findings is a positive active material for a nonaqueous electrolyte secondary battery containing a lithium transition metal composite oxide, in which the lithium transition metal composite oxide has an α-NaFeO$_2$ structure, a molar ratio Li/Me of Li and a transition metal (Me) of 1.05≤Li/Me≤1.4, and a porosity of 5 to 15%.

The composition of the lithium transition metal composite oxide is of a so-called "lithium excess type" that can be expressed as Li$_{1+\alpha}$Me$_{1-\alpha}$O$_2$ (α0).

<<Composition of Lithium Transition Metal Composite Oxide>>

In the first embodiment, in the lithium transition metal composite oxide represented by a composition formula Li$_{1+\alpha}$Me$_{1-\alpha}$O$_2$ (α>0), the molar ratio Li/Me of Li to the transition metal element Me represented by (1+α)/(1−α) is 1.05 or more and 1.4 or less. When the molar ratio Li/Me is in this range, the energy efficiency and discharge capacity of the positive active material are improved. The molar ratio Li/Me is preferably 1.1 or more, and more preferably 1.35 or less.

The lithium transition metal composite oxide preferably contains Ni and Mn or Ni, Co, and Mn as the transition metals (Me).

The molar ratio Mn/Me of Mn to the transition metal element Me is preferably 0.35 or more and less than 0.6. When the molar ratio Mn/Me is in this range, the discharge capacity of the positive active material increases. The molar ratio Mn/Me is more preferably 0.4 or more, and still more preferably 0.55 or less.

Although Co contained in the lithium transition metal composite oxide has the effect of improving initial efficiency, Co is expensive because it is a scarce resource. Accordingly, the molar ratio Co/Me of Co to the transition metal element Me is preferably 0.35 or less, more preferably 0.20 or less, still more preferably 0.13 or less, and may be 0.

The molar ratio Ni/Me of Ni to the transition metal element Me is preferably 0.2 or more and 0.6 or less, and more preferably 0.25 or more and 0.55 or less. When the molar ratio Ni/Me is in this range, a tap density of a hydroxide precursor can be improved, and the discharge capacity of the positive active material increases.

<<Crystallinity of Lithium Transition Metal Composite Oxide>>

A lithium transition metal composite oxide according to the first embodiment has an α-NaFeO$_2$ structure. The lithium transition metal composite oxide after synthesis (before charge-discharge) belongs to a space group P3$_1$12 or R3-m. In the lithium transition metal composite oxide belonging to the space group P3$_1$12 of these space groups, a superlattice peak (a peak found in a Li[Li$_{1/3}$Mn$_{2/3}$]O$_2$ type monoclinic phase) is confirmed in a range of 2θ=20 to 22° in an X-ray diffraction pattern using a CuKα tube. However, charge is performed at least once, and the superlattice peak disappears due to a change in symmetry of crystal accompanying extraction of Li in the crystal, so that the lithium transition metal composite oxide belongs to the space group R3-m. Here, P3$_1$12 is a crystal structure model in which atomic positions of 3a site, 3b site and 6c site in the R3-m are refined, and when regularity is recognized in atomic arrangement in the R3-m, the P3$_1$12 model is employed.

Incidentally, "R3-m" should otherwise be denoted by affixing a bar "-" above "3" of "R3m".

In the lithium transition metal composite oxide according to the first embodiment, a half-value width of the diffraction peak belonging to the (104) plane, that is, a value of FWHM(104) is preferably 0.2° or more and 0.6° or less when the space group R3-m is used for a crystal structure model based on the X-ray diffraction pattern. The FWHM (104) is an index of crystallinity from all directions. If the value is too small, crystallization proceeds too much, so that the size of a crystallite becomes large, and diffusion of Li ions is not sufficiently performed; therefore, the discharge capacity decreases. If the value is too large, the crystallinity is low, so that the transport efficiency of Li ions decreases, and the discharge capacity also decreases. Accordingly, the discharge capacity can be increased by setting the crystallinity within the above range.

The diffraction peak present at 2θ=44.1°±1° is indexed to a (114) plane in the space group P3$_1$12 and indexed to a (104) plane in the space group R3-m.

<<Porosity of Lithium Transition Metal Composite Oxide>>

A lithium transition metal composite oxide according to the first embodiment has a porosity of 5 to 15%.

By setting the porosity of the lithium transition metal composite oxide of lithium excess type to 5 to 15%, a nonaqueous electrolyte secondary battery having high energy efficiency and large discharge capacity can be obtained.

In this specification, measurement conditions of the porosity are as follows.

For measurement of the porosity, "autosorb iQ" and control/analysis software "ASiQwin" manufactured by Quantachrome Corporation are used. 1.00 g of a measurement target sample (lithium transition metal composite oxide particles) is placed in a sample tube for measurement, and vacuum-dried at 120° C. for 12 hours to sufficiently remove moisture in the measurement sample. Next, by a nitrogen gas adsorption method using liquid nitrogen, isotherms on the adsorption side and the desorption side are measured at a relative pressure P/P0 (P0=about 770 mmHg) ranging from 0 to 1. Then, a pore distribution is evaluated by performing a calculation by BJH method using the isotherm on the desorption side, and a pore volume ΔV (ml/g) is determined. In addition, separately, the true density d (g/ml) of lithium transition metal composite oxide particles is determined by true density measurement with a helium gas using "ULTRAPYCNOMETER 1000" manufactured by Quantachrome Corporation. Using these results, the porosity is calculated from the following equation.

(Porosity)=ΔV/(1/d+ΔV)×100"%"

<Method of Producing Positive Active Material for Nonaqueous Electrolyte Secondary Battery>

A second embodiment of the present invention is a method of producing a positive active material for a nonaqueous electrolyte secondary battery containing a lithium transition metal composite oxide, including mixing a lithium compound with a transition metal hydroxide precursor and firing the mixture at 750 to 1000° C. to prepare the lithium transition metal composite oxide having an α-NaFeO$_2$ structure, a molar ratio Li/Me of Li and a transition metal (Me) of 1.05≤Li/Me≤1.4, and a porosity of 5 to 15%.

<<Transition Metal Hydroxide Precursor and Method of Producing the Same>>

A transition metal hydroxide precursor used in a method of producing the lithium transition metal composite oxide includes Ni and Mn, or Ni, Co, and Mn as the transition metals (Me), and is preferably a mixture of a compound having an αNi(OH)$_2$-type crystal structure (hereinafter referred to as αMe(OH)$_2$) and a compound having a βNi(OH)$_2$-type crystal structure (hereinafter referred to as βMe(OH)$_2$).

By using a mixture of αMe(OH)$_2$ and βMe(OH)$_2$ as a hydroxide precursor of the lithium transition metal composite oxide, a lithium transition metal composite oxide having a porosity of 5 to 15% can be prepared, and it is possible to obtain a nonaqueous electrolyte secondary battery having high energy efficiency and a large discharge capacity as compared with a case of using an αMe(OH)$_2$ single phase or a βMe(OH)$_2$ single phase.

The precursor having a crystal structure containing αMe(OH)$_2$ and βMe(OH)$_2$ can increase the tap density as compared with the precursor having a crystal structure of αMe(OH)$_2$ single phase or βMe(OH)$_2$ single phase. The lithium transition metal composite oxide with a high pressed density can be prepared using the precursor according to the mixture of αMe(OH)$_2$ and βMe(OH)$_2$. The reason why the crystal structure of the transition metal hydroxide precursor is related to the tap density of the transition metal hydroxide precursor and the pressed density of the lithium transition metal composite oxide is not necessarily clear. However, the present inventor guesses as follows. In an αMe(OH)$_2$ single-phase transition metal hydroxide, since a primary particle size of αMe(OH)$_2$ which has a plate-like shape is large, a volume of a void between primary particles constituting secondary particles increases, and accordingly, it is considered that a density of the transition metal hydroxide precursor decreases. In production conditions of the transition metal hydroxide in which the βMe(OH)$_2$ single phase is generated, since the pH is high, nucleation is prioritized over particle growth of the transition metal hydroxide, so that many fine particles are generated. Accordingly, it is considered that the density of the transition metal hydroxide precursor therefore decreases. Therefore, it is considered that a transition metal hydroxide precursor having a high tap density can be obtained by adopting production conditions of a transition metal hydroxide in which a mixed phase of αMe(OH)$_2$ and βMe(OH)$_2$ is generated, and since a lithium transition metal composite oxide is synthesized using a precursor having a high tap density, a lithium transition metal composite oxide having a high pressed density can be obtained.

In the transition metal hydroxide precursor (hereinafter also simply referred to as "the hydroxide precursor") used for the method of producing a positive active material in the second embodiment, preferable ranges of the molar ratios Mn/Me, Co/Me, and Ni/Me and reasons for limiting the molar ratios are the same as those in the first embodiment.

The hydroxide precursor is preferably produced by reacting a compound containing Ni and Mn, or Ni, Co, and Mn in an aqueous solution having a pH of 10.2 or less.

When the transition metal hydroxide precursor is produced by a coprecipitation method, the pH is usually 10.5 to 14. The hydroxide precursor produced at pH 10.5 or more is a single phase of βMe(OH)$_2$. In contrast, a precursor containing αMe(OH)$_2$ and βMe(OH)$_2$ can be produced by reacting a compound of a transition metal in an aqueous solution having a pH of 10.2 or less. When a lithium transition metal composite oxide prepared from such a precursor is used for a positive active material, the porosity can be reduced, and the energy efficiency in charge-discharge in which the upper limit is 4.45 V (vs. Li/Li$^+$), and the lower limit is 2.0 V (vs. Li/Li$^+$) becomes high.

When the hydroxide precursor is produced, preferably, a solution containing a transition metal (Me) and an alkali solution containing alkali metal hydroxide, a complexing agent, and a reducing agent are added to a reaction tank maintaining alkalinity, and the transition metal hydroxide is coprecipitated.

As the complexing agent, ammonia, ammonium sulfate, ammonium nitrate and the like can be used, and ammonia is preferable. A precursor having a higher tap density can be produced by a crystallization reaction using the complexing agent.

It is preferable to use a reducing agent together with the complexing agent. As the reducing agent, hydrazine, sodium borohydride, or the like can be used, and hydrazine is preferable.

As the alkali metal hydroxide (neutralizing agent), sodium hydroxide, lithium hydroxide or potassium hydroxide can be used.

In producing the hydroxide precursor, Mn of Ni, Co, and Mn is easily oxidized, and it is not easy to produce a coprecipitate precursor in which Ni and Mn, or Ni, Co, and Mn are uniformly distributed in a divalent state. Therefore, uniform mixing at an atomic level of Ni and Mn, or Ni, Co, and Mn tends to be insufficient. In the preferred composition range of the second embodiment of the present invention, since the Mn ratio in transition metal is relatively high, it is important to remove dissolved oxygen in the aqueous solution. As a method of removing dissolved oxygen, a method of bubbling a gas containing no oxygen ($O_2$) can be used. The gas containing no oxygen is not limited, but a nitrogen gas, an argon gas, or the like can be used.

As described above, pH (reaction pH in a reaction tank) in a process of producing a hydroxide precursor by coprecipitating a compound containing Ni and Mn, or Ni, Co, and Mn in a solution is preferably 10.2 or less in order to obtain a mixture of αMe(OH)$_2$ and βMe(OH)$_2$. When the pH is set to such a value, the particle growth rate can be accelerated, so that a stirring duration after completion of dropwise addition of a raw material aqueous solution can be reduced. If the pH is too low, a precursor of αMe(OH)$_2$ single phase is formed, and therefore, the reaction pH preferably exceeds 9.

Examples of raw materials for the hydroxide precursor include, as an Mn compound, manganese oxide, manganese carbonate, manganese sulfate, manganese nitrate, and manganese acetate; as an Ni compound, nickel hydroxide, nickel carbonate, nickel sulfate, nickel nitrate, and nickel acetate; and as a Co compound, cobalt sulfate, cobalt nitrate, and cobalt acetate.

Preferred is a method in which while a raw material aqueous solution (aqueous solution containing a transition metal) of the hydroxide precursor is supplied dropwise, a mixed alkaline solution containing an alkali metal hydroxide (neutralizing agent) such as sodium hydroxide, a complexing agent such as ammonia, and a reducing agent such as hydrazine is appropriately added dropwise. The concentration of the alkali metal hydroxide to be added dropwise is preferably 1.0 to 8.0 M. The concentration of the complexing agent is preferably 0.4 M or more, and more preferably 0.6 M or more. Further, the concentration of the complexing agent is preferably 2.0 M or less, more preferably 1.6 M or less, and still more preferably 1.5 M or less. The concentration of the reducing agent is preferably 0.05 to 1.0 M, and more preferably 0.1 to 0.5 M. The tap density of the hydroxide precursor can be increased by lowering the pH of the reaction tank and adjusting concentration of ammonia (complexing agent) to 0.6 M or more.

A rate of dropwise addition of the raw material aqueous solution has a large effect on the uniformity of an element distribution in a particle of the hydroxide precursor to be produced. Particularly, Mn hardly forms a uniform element distribution with Ni and Co, and therefore the rate of dropwise addition requires attention. A preferred rate of dropwise addition is affected by a size of the reaction tank, stirring conditions, a pH, a reaction temperature, etc. and the rate of dropwise addition is preferably 30 ml/min or less. For increasing the discharge capacity, the rate of dropwise addition is more preferably 10 ml/min or less, and most preferably 5 ml/min or less.

Further, when a complexing agent such as ammonia is present in the reaction tank and a certain convection condition is applied, rotation of particles and revolution in a stirring tank are accelerated by further continuing stirring after the completion of dropwise addition of the raw material aqueous solution, and in this process, particles grow stepwise in the form of a homocentric sphere while impinging on one another. That is, the hydroxide precursor is formed by undergoing two-staged reactions of a metal complex formation reaction in adding dropwise the aqueous solution of a raw material to the reaction tank and a precipitate formation reaction occurring while the metal complex remains in the reaction tank. Accordingly, by appropriately selecting a time during which stirring is further continued after the completion of dropwise addition of the raw material aqueous solution, a hydroxide precursor having a desired particle size can be obtained.

The stirring duration after the completion of dropwise addition of an aqueous solution of a raw material is preferably 0.5 hours or more, and more preferably 1 hour or more in order to grow particles as uniform spherical particles although a preferred stirring duration is affected by a size of the reaction tank, stirring conditions, a pH, and a reaction temperature. Further, the stirring duration is preferably 15 hours or less, more preferably 10 hours or less, and most preferably 5 hours or less in order to reduce a possibility that power performance in a low SOC region of a battery is insufficient due to a too large particle size.

D50 which is a particle size where a cumulative volume is 50% in a particle size distribution of secondary particles of the hydroxide precursor and the lithium transition metal composite oxide is preferably 13 µm or less. For that purpose, for example, when the pH is controlled so as to be 9.1 to 10.2, the stirring duration is preferably 1 to 3 hours.

When particles of the hydroxide precursor are produced using a sodium compound such as sodium hydroxide as a neutralizing agent, sodium ions attached to the particles are preferably cleaned and removed in a subsequent cleaning step. For example, the condition that the number of cleanings with 500 ml of ion-exchange water in taking out the produced hydroxide precursor by suction filtration is 6 times or more can be employed.

As a precursor of a positive active material for a non-aqueous electrolyte secondary battery, as shown in Comparative Example 9 below, a method using a transition metal carbonate precursor is also known. However, in general, when the transition metal carbonate precursor is used, a gas (mainly, carbon dioxide) is generated from the precursor during a firing process. Due to the gas generation, many pores are generated in the positive active material, and the porosity tends to increase.

<<Method of Producing Lithium Transition Metal Composite Oxide>>

A lithium transition metal composite oxide is produced by mixing a lithium compound with the transition metal hydroxide precursor produced as described above and firing the mixture at 750 to 1000° C.

By setting the firing temperature in the above range, the porosity of the lithium transition metal composite oxide can be set to 5 to 15%.

As the lithium compound, lithium hydroxide, lithium carbonate, lithium nitrate, lithium acetate and the like can be used. However, with respect to the amount of the lithium compound, it is preferred to charge the lithium compound in an excessive amount by about 1 to 5 mol % factoring in loss of a part thereof during firing.

The firing temperature affects the reversible capacity of the active material.

When the firing temperature is too high, the resulting active material corrupts in association with an oxygen releasing reaction and in addition to the hexagonal main phase, a phase defined as monoclinic $Li[Li_{1/3}Mn_{2/3}]O_2$ tends to be observed as a separate phase but not as a solid solution phase. It is not preferred to contain a too high proportion of such a separate phase since this leads to a reduction of the reversible capacity of the active material. With respect to such a material, impurity peaks are observed near 35° and 45° in the X-ray diffraction pattern. Accordingly, it is preferred that the firing temperature be adjusted lower than the temperature which affects the oxygen releasing reaction of the active material. An oxygen releasing temperature of the active material slightly differs depending on the composition of the active material, and when a lithium excess type active material is produced using the precursor according to the second embodiment, the oxygen releasing temperature of the active material is around 1000° C. or more. However, it is preferred to previously check the oxygen releasing temperature of the active material. Particularly, it is confirmed that the oxygen releasing temperature of a hydroxide precursor is shifted to the lower temperature as the Co amount contained in a sample is larger, and therefore the firing temperature requires attention. As a method for checking the oxygen releasing temperature of the active material, a mixture of a hydroxide precursor and a lithium compound may be subjected to thermal mass analysis (TG-DTA measurement) in order to simulate the firing reaction process; however in this method, platinum employed for a sample chamber of a measurement instrument may be possibly corroded with an evaporated Li component to damage the instrument. Therefore, a composition, of which crystallization has been promoted to a certain extent by employing a firing temperature of about 500° C. beforehand, is preferable to be subjected to thermal mass analysis.

On the other hand, when the firing temperature is too low, there is such a tendency that crystallization does not adequately proceed and an electrode performance is lowered. By adequate crystallization, resistance at a grain boundary can be reduced and smooth lithium ion transport can be promoted.

The present inventors have analyzed a half-value width of a diffraction peak of the lithium excess type active material in detail, and, as a result, they have found that a strain remains in a lattice in the sample synthesized at a temperature lower than 750° C., and most of the strain can be eliminated by synthesizing the active material at a temperature of 750° C. or higher. It has been also found that a size of a crystallite increased in proportion to a rise of a synthesis temperature. Thus, also in the case of using the precursor according to the second embodiment, it is preferable to produce the active material at a firing temperature capable of obtaining particles in which there is little lattice distortion in a system and a size of a crystallite adequately grows, specifically at a firing temperature at which an amount of the strain to a lattice constant is 2% or less and the size of a crystallite grows to 50 nm or more. When an electrode using this active material is charged and discharged, the crystallite size is changed by expansion and contraction. However, it has been found that the crystallite size is kept at 30 nm or more even in the charge-discharge process. That is, if the firing temperature is selected to be a temperature as close as possible to the above-described oxygen releasing temperature of the active material, an active material is first provided with remarkably high reversible capacity.

As described above, a preferable firing temperature differs depending on the oxygen releasing temperature depending on the composition of the active material. However, in order to obtain an active material having a sufficient discharge capacity under the use conditions assumed in the present invention, the firing temperature is preferably 750 to 1000° C., and more preferably 750 to 950° C.

<Positive Electrode for Nonaqueous Electrolyte Secondary Battery, and Nonaqueous Electrolyte Secondary Battery>

A third embodiment of the present invention is a positive electrode for a nonaqueous electrolyte secondary battery containing the positive active material of the first embodiment, and a nonaqueous electrolyte secondary battery including the positive electrode. By providing this positive electrode, it is possible to provide a nonaqueous electrolyte secondary battery having high safety and having a large discharge capacity when used in a potential range lower than the region where the potential change is flat.

To check the capacity of the active material, a test cell is prepared according to the following procedure, and a charge-discharge test is performed.

When the capacity of the positive electrode taken out from a disassembled battery is evaluated, before the battery is disassembled, constant current discharge is performed up to a battery voltage, which is the lower limit of a designated voltage, at a current value (A) that is 1/10 of a nominal capacity (Ah) of the battery, and the battery is brought to a completely discharged state. Then, after disassembling the battery and taking out the electrode, the plate is washed and dried. A test cell is prepared using the obtained positive electrode as a working electrode and lithium metal as a counter electrode. All of the above processes are performed in an argon atmosphere having a dew point of −60° C. or lower.

On the other hand, in a case of a lithium transition metal composite oxide powder (powder before charge and discharge) before production of the positive electrode, a paste obtained by kneading a conductive auxiliary with a binder and a dispersion medium is applied to a current collector foil and dried to produce a positive electrode. A test cell is prepared using the obtained positive electrode as a working electrode and lithium metal as a counter electrode.

The test cell obtained by the above procedure is subjected to a capacity confirmation test in a thermostat at 25° C. Constant-current charge is performed at a current value of 20 mA per 1 g of a positive composite, until an end-of-charge voltage reaches 4.6 V. After reaching 4.6 V, the charge is terminated when the current becomes 1/6 of the set value. After a rest of 10 minutes, discharge is performed at the same current with an end-of-discharge voltage of 2.0 V. The second charge-discharge is performed under the same conditions except that 10 minutes of the rest is taken and the upper limit voltage is set to 4.45 V. Here, a discharge capacity (mAh/g) is obtained by dividing the obtained discharge capacity (mAh) by the mass of the active material included in the positive electrode.

<<Positive Electrode>>

The positive electrode according to the third embodiment includes a powder mainly composed of the positive active material according to the first embodiment. As other components, a conductive agent, a binder, a thickener, a filler, and the like may be contained.

The powder of the positive active material preferably has an average particle size of 100 μm or less. In particular, the powder of the positive active material preferably has an average particle size of 15 μm or less for the purpose of improving high power characteristics of a nonaqueous electrolyte secondary battery. For obtaining a powder in a predetermined shape, there are a method of producing a precursor of a predetermined size and a method using a pulverizer, a classifier, and the like. For example, a mortar, a ball mill, a sand mill, a vibratory ball mill, a planetary ball mill, a jet mill, a counter jet mill, a whirling airflow type jet mill, a sieve or the like is used. At the time of pulverization, wet type pulverization in the presence of water or an organic solvent such as hexane can be also employed. A classification method is not particularly limited. A sieve or an air classifying apparatus may be employed based on the necessity for powders subjected to pulverization both in dry manner and in wet manner.

The conductive agent is not limited as long as it is an electron conductive material which does not cause an adverse effect on the battery characteristics. Usually, one or a mixture of conductive materials such as natural graphite (scaly graphite, flaky graphite, earthy graphite, and the like), artificial graphite, carbon black, acetylene black, ketjen black, carbon whisker, carbon fibers, metal (copper, nickel, aluminum, silver, gold, and the like) powder, metal fibers, and conductive ceramic materials can be contained as the conductive agent.

Among these, acetylene black is preferable as the conductive agent from the viewpoints of electron conductivity and coatability. The amount of the conductive agent to be added is preferably from 0.1% by mass to 50% by mass and particularly preferably from 0.5% by mass to 30% by mass based on the total mass of the positive electrode or the negative electrode. Especially, use of acetylene black after pulverized into ultrafine particles with a diameter of 0.1 to 0.5 μm is preferable since the amount of carbon to be needed can be lessened. A mixing method for mixing these components is physical mixing and homogeneous mixing is ideal. Therefore, mixing may be carried out in a dry manner or a wet manner by using a powder mixing apparatus such as a V-type mixing apparatus, an S-type mixing apparatus, an attriter, a ball mill, or a planetary ball mill.

As the binder, usually, thermoplastic resins such as polytetrafluoroethylene (PTFE), polyvinylidene fluoride (PVDF), polyethylene and polypropylene, and polymers having rubber elasticity, such as ethylene-propylene-diene terpolymers (EPDM), sulfonated EPDM, styrene butadiene rubber (SBR) and fluororubber can be used alone or as a mixture of two or more thereof. The amount of the binder to be added is preferably from 1% by mass to 50% by mass and particularly preferably from 2% by mass to 30% by mass based on the total mass of the positive electrode or the negative electrode.

The filler is not limited as long as it is a material that does not adversely affect the battery performance. Usually, olefin polymers such as polypropylene and polyethylene, amorphous silica, alumina, zeolites, glass, carbon, and the like are used. The amount of the filler to be added is preferably 30% by mass or less based on the total mass of the positive electrode or the negative electrode.

<<Negative Electrode>>

A negative active material used for a negative electrode of a nonaqueous electrolyte secondary battery is not limited. Any material which has a configuration of absorbing and releasing lithium ions can be selected. Examples of the negative material include, in addition to titanium materials such as lithium titanate having the spinel crystal structure typified by $Li[Li_{1/3}Ti_{5/3}]O_4$; Si, Sb, or Sn-based alloy material-lithium metal; lithium alloys (lithium metal-containing alloys such as lithium-silicon, lithium-aluminum, lithium-lead, lithium-tin, lithium-aluminum-tin, lithium-gallium, and wood's alloy); lithium composite oxides (lithium-titanium); and silicon oxide, and moreover, alloys, carbon materials (e.g. graphite, hard carbon, lower temperature calcined carbon, amorphous carbon) capable of absorbing and releasing lithium.

The negative active material is used as a powder similarly to the positive active material, and the negative electrode may contain other components similarly to the positive electrode.

<<Production of Positive and Negative Electrodes>>

The positive electrode and the negative electrode are preferably produced by kneading the above-described main components (each active material) and the other materials to obtain a composite, mixing the composite with an organic solvent, such as N-methylpyrrolidone or toluene, or water, thereafter, applying or pressure-bonding the obtained mixture solution to the current collector described in detail below, and carrying out heat treatment at a temperature of about 50 to 250° C. for about 2 hours. With respect to the above-described application method, it is preferable, for example, to carry out application in an arbitrary thickness and an arbitrary shape by using a technique such as roller coating with an applicator roller, screen coating, doctor blade coating, spin coating, or a bar coater; however the method is not limited to these examples.

As the current collector, a current collector foil such as an Al foil and a Cu foil can be used. An Al foil is preferable as the current collector foil of the positive electrode, and a Cu foil is preferable as the current collector foil of the negative electrode. The thickness of the current collector foil is preferably 10 to 30 μm. A thickness of a composite layer after pressing is preferably 40 to 150 μm (excluding the thickness of the current collector foil).

<<Nonaqueous Electrolyte>>

The nonaqueous electrolyte used for a nonaqueous electrolyte secondary battery is not limited, and those that are generally proposed to be used in nonaqueous secondary batteries and the like can be used. Examples of a nonaqueous solvent to be used for the nonaqueous electrolyte include cyclic carbonic acid esters such as propylene carbonate, ethylene carbonate, butylene carbonate, chloroethylene carbonate, and vinylene carbonate; cyclic esters such as γ-butyrolactone, and γ-valerolactone; chain carbonates such as dimethyl carbonate, diethyl carbonate, and ethyl methyl carbonate; chain esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile, and benzonitrile; dioxolane and derivatives thereof; ethylene sulfide, sulfolane, sultone and derivatives thereof, and these compounds may be used alone or two or more of them may be used in the form of a mixture; however, the nonaqueous solvent is not limited to these examples.

Examples of an electrolyte salt to be used for the nonaqueous electrolyte include inorganic ion salts containing one of lithium (Li), sodium (Na), and potassium (K) such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octylsulfonate, and lithium dodecylbenzenesulfonate, and these ionic compounds may be used alone or two or more of them may be used in the form of a mixture.

Further, use of $LiPF_6$ or $LiBF_4$ and a lithium salt having a perfluoroalkyl group such as $LiN(C_2F_5SO_2)_2$ in the form of a mixture can further lower the viscosity of the electrolyte. Therefore, the low temperature characteristics can be further improved, and self-discharge can be suppressed. Consequently, use of such a mixture is more desirable.

A room temperature molten salt or an ionic liquid may be used as the nonaqueous electrolyte.

The concentration of the electrolyte salt in the nonaqueous electrolyte is preferably 0.1 mol/L to 5 mol/L and more preferably 0.5 mol/L to 2.5 mol/L in order to reliably obtain a nonaqueous electrolyte secondary battery having high battery characteristics.

<<Separator>>

As a separator of a nonaqueous electrolyte secondary battery, porous membranes, nonwoven fabrics, and the like showing excellent high rate performance are preferably used alone or in combination. Examples of a material constituting a separator for a nonaqueous electrolyte secondary battery include polyolefin resins typified by polyethylene and polypropylene; polyester resins typified by poly(ethylene terephthalate) and poly(butylene terephthalate); poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

Porosity of the separator is preferably 98% by volume or less from the viewpoint of strength. The porosity is preferably 20% by volume or more from the viewpoint of charge-discharge characteristics.

Further, as the separator, a polymer gel comprised of, for example, acrylonitrile, ethylene oxide, propylene oxide, methyl methacrylate, vinyl acetate, vinylpyrrolidone, a polymer such as poly(vinylidene fluoride) with an electrolyte may be used. Use of the nonaqueous electrolyte in the gel state as described above is preferable in terms of an effect of preventing liquid leakage.

Further, use of the porous membranes or nonwoven fabrics as described above in combination with the polymer gel for the separator is preferable because of improvement of a liquid retention property of the electrolyte. That is, a film is formed by coating the surface and fine pore wall faces of a polyethylene finely porous membrane with a solvophilic polymer in a thickness of several μm or thinner, and the electrolyte is maintained in the fine pores of the film, and thus causing gelation of the solvophilic polymer.

Examples of the solvophilic polymer include, in addition to poly(vinylidene fluoride), polymers obtained by crosslinking acrylate monomers having ethylene oxide groups, ester groups, or the like, epoxy monomers, monomers having isocyanato groups, and the like. These monomers can be crosslinked by radiating electron beams (EB) or adding a radical initiator and heating or radiating ultraviolet (UV) rays.

<<Configuration of Nonaqueous Electrolyte Secondary Battery>>

The configuration of the nonaqueous electrolyte secondary battery according to the third embodiment is not particularly limited, and examples include cylindrical batteries, prismatic batteries (rectangular batteries), and flat batteries having a positive electrode, a negative electrode and a roll-shaped separator.

Figure 5:
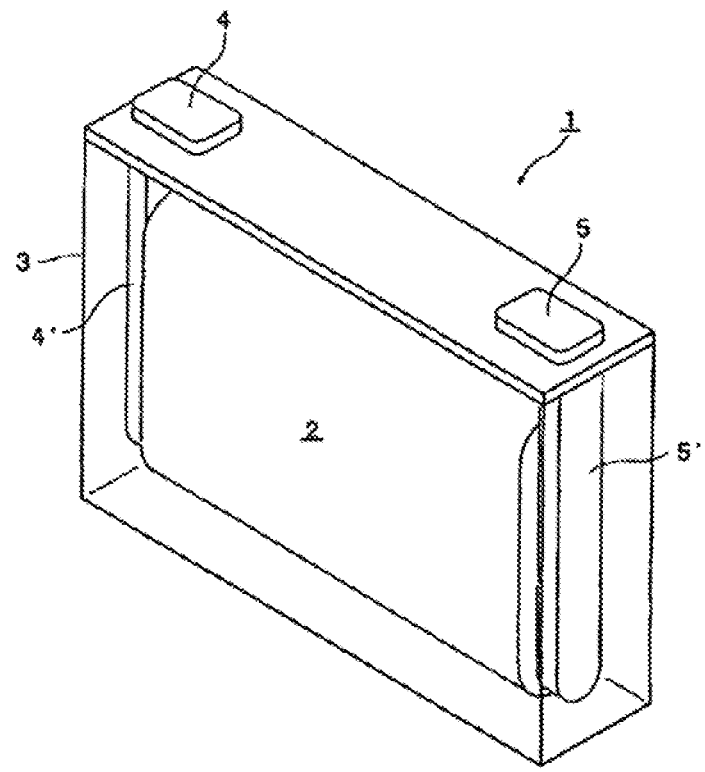
FIG. 5 is an external perspective view showing one embodiment of a nonaqueous electrolyte secondary battery according to the present invention.

FIG. 5 shows an external perspective view of a rectangular nonaqueous electrolyte secondary battery 1 according to an embodiment of the present invention. FIG. 5 is a view showing an inside of a case in a perspective manner. In the nonaqueous electrolyte secondary battery 1 shown in FIG. 5, an electrode group 2 is housed in a battery case 3. The electrode group 2 is formed by winding a positive electrode, including a positive active material, and a negative electrode, including a negative active material, with a separator interposed between the electrodes. The positive electrode is electrically connected to a positive electrode terminal 4 through a positive electrode lead 4', and the negative electrode is electrically connected to a negative electrode terminal 5 through a negative electrode lead 5'.

<<Configuration of Energy Storage Apparatus>>

Figure 6:
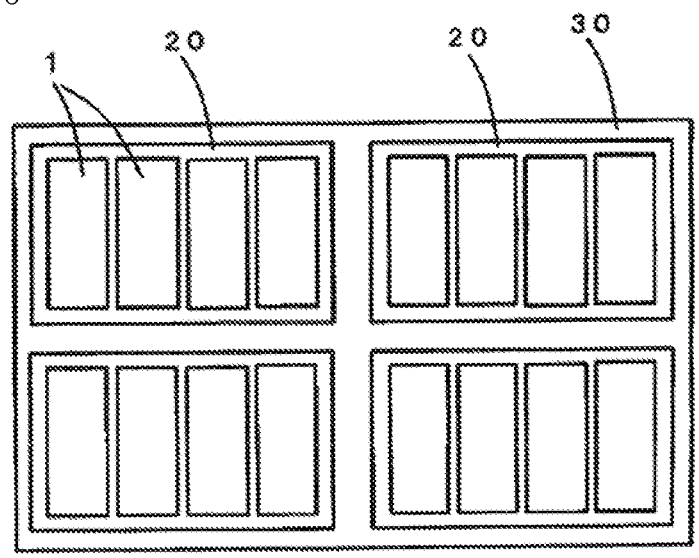
FIG. 6 is a schematic diagram showing an energy storage apparatus including a plurality of the nonaqueous electrolyte secondary batteries according to the present invention.

An embodiment of the present invention includes an energy storage apparatus including a plurality of the nonaqueous electrolyte secondary batteries described above. An energy storage apparatus 30 shown in FIG. 6 includes a plurality of energy storage units 20. Each of the energy storage units 20 includes a plurality of the nonaqueous electrolyte secondary batteries 1. The energy storage apparatus 30 can be mounted as a power source for an automobile such as an electric vehicle (EV), a hybrid vehicle (HEV), a plug-in hybrid vehicle (PHEV), or the like.

EXAMPLES

First, Examples and Comparative Examples in which production conditions of the lithium transition metal composite oxide having the same composition are changed will be described.

Preparation of Positive Active Material (Lithium Transition Metal Composite Oxide)

Example 1

In preparing the active material of Example, a transition metal hydroxide precursor was produced using a reaction crystallization method. First, 315.4 g of nickel sulfate hexahydrate, 168.6 g of cobalt sulfate heptahydrate, and 530.4 g of manganese sulfate pentahydrate were weighed, and all of these compounds were dissolved in 4 L of ion-exchanged water to prepare a 1.0 M sulfate aqueous solution in which the molar ratio of Ni:Co Mn was 30:15:55. Next, 2 L of ion-exchange water was poured in a 5 L reaction tank, and an $N_2$ gas was bubbled for 30 min to remove oxygen in the ion-exchange water. The temperature of the reaction tank was set at 50° C. (±2° C.), and the reaction tank was set so as to have a sufficient convection therein while the contents in the reaction tank was stirred at a rotation speed of 1500 rpm using a paddle impeller equipped with a stirring motor. The sulfate stock solution was added dropwise to the reaction tank at a rate of 1.3 ml/min for 50 h. Here, during a time period between the start and the end of the dropwise addition, a mixed alkaline solution including 4.0 M sodium hydroxide, 1.25 M ammonia and 1.0 M hydrazine was appropriately added dropwise to perform control so that the pH in the reaction tank was always 9.8 (±0.1), and a part of the reaction solution was discharged through overflow to perform control so that the total amount of the reaction solution was always 2 L or less. After completion of dropwise addition, stirring the contents in the reaction tank was continued for further 1 hour. After stirring was stopped, the reaction tank was left standing at room temperature for 12 hours or more.

Next, hydroxide precursor particles generated in the reaction tank were separated using a suction filtration device, sodium ions deposited on the particles were further washed off using ion-exchange water, and the particles were dried at 80° C. for 20 hours under normal pressure in air atmosphere using an electric furnace. Thereafter, the particles were ground with an agate automatic mortar for several minutes to equalize the particle size. Thus, a transition metal hydroxide precursor was produced.

1.294 g of lithium hydroxide monohydrate was added to 2.262 g of the transition metal hydroxide precursor, and the mixture was adequately mixed using an automatic mortar made of agate to prepare a mixed powder of which the molar ratio of Li:(Ni, Co, Mn) was 120:100. Using a pellet molding machine, the mixed powder was molded at a pressure of 6 MPa to provide pellets having a diameter of 25 mm. The amount of the mixed powder subjected to pellet molding was determined by performing calculation in such a manner that the estimated mass of a final product was 2.5 g. One of the pellets was placed in an alumina boat having a total length of about 100 mm, the boat was placed in a box-type electric furnace (model: AMF 20), the temperature was elevated from ordinary temperature to 800° C. under normal pressure in an air atmosphere over 10 hours, and the pellet was fired at 800° C. for 4 hours. The box-type electric furnace has an internal dimension of 10 cm (height), 20 cm (width) and 30 cm (depth), and is provided with electrically heated wires at intervals of 20 cm in the width direction. After firing, a heater was switched off, and the alumina boat was naturally cooled as it was left standing in the furnace. As a result, the temperature of the furnace decreased to about 200° C. after 5 hours, and thereafter the temperature slightly gently decreased. After elapse of a whole day and night, the pellet was taken out after confirming that the temperature of the furnace was 100° C. or lower, and the pellet was ground with an agate automatic mortar for several minutes for equalizing the particle size. In this way, a lithium transition metal composite oxide $Li_{1.09}Ni_{0.27}Co_{0.14}Mn_{0.50}O_2$ according to Example 1 was prepared.

Examples 2 to 4

Lithium transition metal composite oxides according to Examples 2 to 4 were prepared in the same manner as in Example 1, except that a mixed powder of a transition metal hydroxide precursor and lithium hydroxide monohydrate was fired at 850° C., 900° C., and 750° C., respectively.

Examples 5 and 6

Lithium transition metal composite oxides according to Examples 5 and 6 were prepared in the same manner as in Example 1, except that the pH of a reaction tank was 10.0 and 10.2 in producing a transition metal hydroxide precursor.

Comparative Examples 1 to 4

Lithium transition metal composite oxides according to Comparative Examples 1 to 4 were prepared in the same manner as in Example 1, except that a mixed powder of a transition metal hydroxide precursor and lithium hydroxide monohydrate was fired at 700° C., 650° C., 1050° C. and 1200° C., respectively.

Comparative Examples 5 to 8, and 16

Lithium transition metal composite oxides according to Comparative Examples 5 to 7 and 16 were prepared in the same manner as in Example 1, except that the pH of a reaction tank was 10.5, 10.7, 11.0, and 9.0 in producing a transition metal hydroxide precursor.

Lithium transition metal composite oxide according to Comparative Example 8 was prepared in the same manner as in Comparative Example 7, except that the temperature at which a transition metal hydroxide precursor and lithium hydroxide monohydrate were fired was changed to 650° C.

Comparative Example 9

Lithium transition metal composite oxides according to Comparative Example 9 was prepared in the same manner as in Example 1, except that a transition metal carbonate precursor was produced by the following method instead of the transition metal hydroxide precursor.

Here, during a time period between the start and the end of the dropwise addition of the sulfate stock solution, a mixed alkaline solution including 1.0 M sodium carbonate, 0.5 M ammonia and 0.2 M hydrazine was appropriately added dropwise to perform control so that the pH in the reaction tank was always 7.9 (±0.1).

Comparative Example 10

Powders of lithium hydroxide monohydrate (LiOH·H$_2$O), nickel hydroxide (Ni(OH)$_2$), cobalt hydroxide (Co(OH)$_2$), and manganese oxyhydroxide (MnOOH) were mixed at a molar ratio of Li:Ni:Co:Mn of 120:30:15:55, and the mixture was fired at 800° C. In this way, a lithium transition metal composite oxide according to Comparative Example 10 was prepared.

<Confirmation of Crystal Phase of Precursor>

The crystal phases of the transition metal hydroxide precursors produced in the above Examples and Comparative Examples, and Examples and Comparative Examples below were confirmed by X-ray diffraction measurement.

For reference, results of the X-ray diffraction measurement of the precursor are shown in FIG. 1. In the precursor according to Comparative Example 7 synthesized when the pH of the reaction tank was 11.0, a diffraction line derived from the βNi(OH)$_2$-type crystal structure was observed. In the precursor according to Example 1 synthesized when the pH of the reaction tank was 9.8, a mixed phase of αNi(OH)$_2$-type crystal structure and βNi(OH)$_2$-type crystal structure was observed. In the precursor according to Comparative Example 16 synthesized when the pH of the reaction tank was 9.0, a diffraction line derived from the βNi(OH)$_2$-type crystal structure was observed.

<Confirmation of Crystal Structure of Lithium Transition Metal Composite Oxide>

The fact that the lithium transition metal composite oxides according to the above Examples and Comparative Examples, and Examples and Comparative Examples below have an αNi(OH)$_2$-type crystal structure was confirmed by matching the structure model with the diffraction pattern in the X-ray diffraction measurement.

In Examples 1 to 19 and Comparative Examples 1 to 10 and 14 to 16, a superlattice peak specific to a lithium excess type positive active material was observed in the range of 2θ=20 to 22°.

<Measurement of Porosity of Lithium Transition Metal Oxide>

The porosities of the lithium transition metal composite oxides according to the above Examples and Comparative Examples, and Examples and Comparative Examples below were measured according to the above-described conditions and procedures.

<Production of Positive Electrode for Nonaqueous Electrolyte Secondary Battery>

The positive electrodes for a nonaqueous electrolyte secondary battery according to Examples and Comparative Examples were produced in the following procedure, using the lithium transition metal composite oxides according to the above Examples and Comparative Examples, and Examples and Comparative Examples below for the positive active material.

A coating paste was prepared in which the positive active material, acetylene black (AB) and polyvinylidene fluoride (PVdF) were kneaded at a ratio of 90:5:5 in terms of a mass ratio and dispersed with N-methylpyrrolidone as a dispersion medium. The coating paste was applied to one surface of an aluminum foil current collector having a thickness of 20 μm, dried, and then pressed to produce a positive electrode plate. In all the positive electrodes according to Examples and Comparative Examples, the application weight per unit area and the porosity were adjusted.

<Production of Nonaqueous Electrolyte Secondary Battery>

The positive electrode for a nonaqueous electrolyte secondary battery produced as described above was partially cut out, and a test battery as a nonaqueous electrolyte secondary battery was produced by the following procedure. For the purpose of accurately observing the independent behavior of a positive electrode, metallic lithium was brought into close contact with a nickel foil current collector and used for a counter electrode, i.e. a negative electrode. Here, a sufficient amount of metallic lithium was placed on the negative electrode so that the capacity of the nonaqueous electrolyte secondary battery was not limited by the negative electrode.

As a nonaqueous electrolyte, a solution obtained by dissolving LiPF$_6$, so as to be 1 mol/L in concentration, in a mixed solvent of ethylene carbonate (EC)/ethylmethyl carbonate (EMC)/dimethyl carbonate (DMC) in a volume ratio of 6:7:7, was used. As a separator, a microporous membrane made of polypropylene, the surface of which was modified with polyacrylate, was used. As an outer case, a metal resin composite film made of polyethylene terephthalate (15 μm)/aluminum foil (50 μm)/metal-adhesive polypropylene film (50 μm) was used. The electrode was housed such that the open ends of a positive electrode terminal and a negative electrode terminal were externally exposed, fusion margins with the inner surfaces of the above-described metal resin composite films facing each other were airtightly sealed except a portion forming an electrolyte solution filling hole, and the nonaqueous electrolyte was injected, followed by sealing the electrolyte solution filling hole.

<Initial Charge-Discharge Step>

The nonaqueous electrolyte secondary battery produced by the above procedure was subjected to an initial charge-discharge process at 25° C. Charge was constant current-constant voltage charge with a current of 0.1 C and a voltage of 4.6 V, and the condition of the end-of-charge was set at a time point at which the current value was reduced to ⅙. Discharge was constant current discharge with a current of 0.1 C and an end voltage of 2.0 V. This charge-discharge cycle was carried out twice. Here, a rest process of 30 minutes was provided after each of charge and discharge. Through the above processes, a nonaqueous electrolyte secondary battery was completed.

<Charge-Discharge Test>

Next, a charge-discharge test for one cycle was performed under the conditions when the nonaqueous electrolyte secondary battery was used. Charge was constant current-constant voltage charge with a current of 0.1 C and a voltage of 4.45 V, and the condition of the end-of-charge was set at a time point at which the current value was reduced to ⅙. Discharge was constant current discharge with a current of 0.1 C and an end voltage of 2.0 V. Here, a rest process of 10 minutes was provided after each of charge and discharge. A "discharge capacity (mAh/g)" was obtained by dividing the discharge capacity (mAh), obtained by this cycle, by the mass of the positive active material included in the positive electrode.

Figure 2:
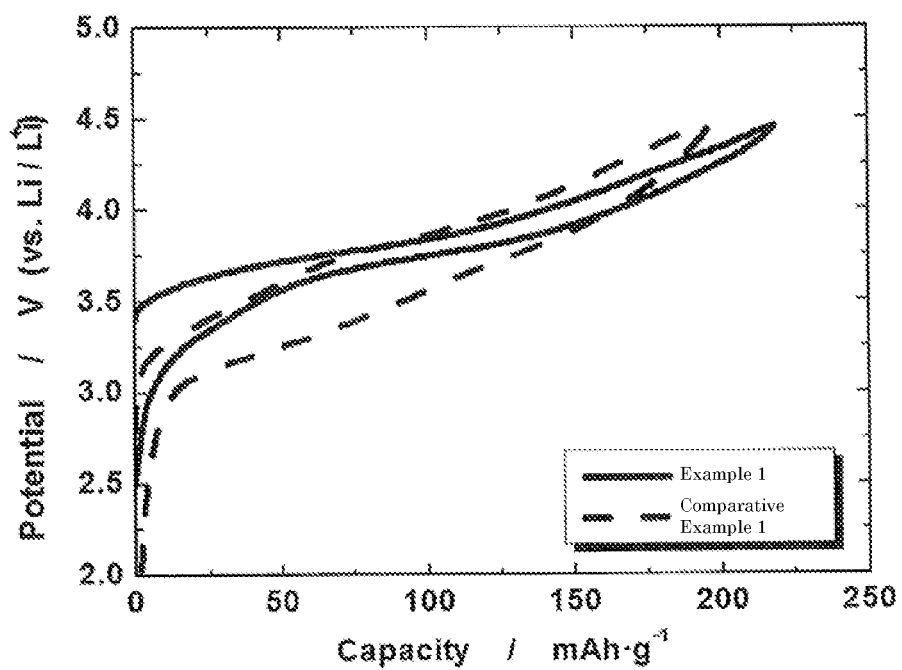
FIG. 2 is a view showing charge-discharge curves during use of nonaqueous electrolyte secondary batteries according to Example 1 and Comparative Example 1.

FIG. 2 shows charge-discharge curves of Example 1 and Comparative Example 1 during the charge-discharge test.

<Calculation of Energy Efficiency>

In the above charge-discharge test for one cycle, charge energy (mWh/g) was calculated by multiplying the amount of charge (mAh/g) during charge by a charge average voltage (V), discharge energy (mWh/g) was calculated by multiplying the discharge capacity (mAh/g) by a discharge average voltage (V), and a percentage of the discharge energy (mWh/g) relative to the charge energy (mWh/g) was calculated as energy efficiency (%).

That is, a magnitude of the charge-discharge hysteresis conceptually corresponds to the charge curve and the discharge curve shown in FIG. 2 and an area of a closed curved surface surrounded by vertical and horizontal axes of a graph. If the area of the closed curved surface is 0, the energy efficiency is 100%.

The molar ratio Li/Me of Li and the transition metal (Me) is 1.2 in the range of 1.05≤Li/Me≤1.4, and for the lithium transition metal composite oxide containing Ni, Co, and Mn as the transition metals (Me), it is found that in the positive active material of Example 1 in which the porosity of the lithium transition metal composite oxide is 8.7% in the range of 5 to 15%, the charge-discharge hysteresis is small compared with the positive active material of Comparative Example 1 in which the porosity is 15.5% out of the above range, and excellent energy efficiency is exhibited.

Table 1 below shows results of the charge-discharge test of nonaqueous electrolyte secondary batteries using the lithium transition metal composite oxides according to the above Examples and Comparative Examples for the positive active materials.

TABLE 1

| | Transition metal composition Ni/Co/Mn [mol %] | Li/Me ratio [Molar ratio] | Firing temperature [° C.] | pH of reaction tank | Crystal phase of precursor | Composite oxide porosity [%] | Energy efficiency [%] | Discharge capacity [m Ah/g] |
|---|---|---|---|---|---|---|---|---|
| Example 1 | 30/15/55 | 1.2 | 800 | 9.8 | $\alpha Me(OH)_2 + \beta Me(OH)_2$ | 8.7 | 96 | 218 |
| Example 2 | 30/15/55 | 1.2 | 850 | 9.8 | $\alpha Me(OH)_2 + \beta Me(OH)_2$ | 6.8 | 96 | 220 |
| Example 3 | 30/15/55 | 1.2 | 900 | 9.8 | $\alpha Me(OH)_2 + \beta Me(OH)_2$ | 5.0 | 97 | 222 |
| Example 4 | 30/15/55 | 1.2 | 750 | 9.8 | $\alpha Me(OH)_2 + \beta Me(OH)_2$ | 11.5 | 95 | 215 |
| Example 5 | 30/15/55 | 1.2 | 800 | 10.0 | $\alpha Me(OH)_2 + \beta Me(OH)_2$ | 13.7 | 96 | 215 |
| Example 6 | 30/15/55 | 1.2 | 800 | 10.2 | $\alpha Me(OH)_2 + \beta Me(OH)_2$ | 15.0 | 96 | 212 |
| Comparative Example 1 | 30/15/55 | 1.2 | 700 | 9.8 | $\alpha Me(OH)_2 + \beta Me(OH)_2$ | 15.5 | 86 | 195 |
| Comparative Example 2 | 30/15/55 | 1.2 | 650 | 9.8 | $\alpha Me(OH)_2 + \beta Me(OH)_2$ | 17.2 | 84 | 192 |
| Comparative Example 3 | 30/15/55 | 1.2 | 1050 | 9.8 | $\alpha Me(OH)_2 + \beta Me(OH)_2$ | 4.4 | 88 | 184 |
| Comparative Example 4 | 30/15/55 | 1.2 | 1200 | 9.8 | $\alpha Me(OH)_2 + \beta Me(OH)_2$ | 2.8 | 85 | 165 |
| Comparative Example 5 | 30/15/55 | 1.2 | 800 | 10.5 | $\beta Me(OH)_2$ | 15.8 | 85 | 194 |
| Comparative Example 6 | 30/15/55 | 1.2 | 800 | 10.7 | $\beta Me(OH)_2$ | 17.2 | 85 | 190 |
| Comparative Example 7 | 30/15/55 | 1.2 | 800 | 11.0 | $\beta Me(OH)_2$ | 19.8 | 85 | 187 |
| Comparative Example 8 | 30/15/55 | 1.2 | 650 | 11.0 | $\beta Me(OH)_2$ | 22.0 | 85 | 182 |
| Comparative Example 16 | 30/15/55 | 1.2 | 800 | 9.0 | $\beta Me(OH)_2$ | 21.2 | 91 | 194 |
| Comparative Example 9 | 30/15/55 | 1.2 | 800 | 7.9 | $MeCO_3$ | 33.0 | 87 | 215 |
| Comparative Example 10 | 30/15/55 | 1.2 | 800 | (Solid phase method) | — | 16.6 | 83 | 168 |

The positive active materials shown in Table 1 all have the same composition. In Examples 1 to 4 and Comparative Examples 1 to 4, the reaction pH is also the same, 9.8 when the transition metal hydroxide precursor is produced, and the precursor contains α-type and β-type crystal phases.

However, in Examples 1 to 4 in which the precursor and the lithium compound are fired at 750 to 900° C., the porosity of the lithium transition metal composite oxide is in the range of 5 to 15%. On the other hand, in Comparative Examples 1 to 4 in which the firing temperature is out of 750 to 1000° C., when the firing temperature is lower than 750° C., a lithium transition metal composite oxide having a porosity of more than 15% is obtained, and when the firing temperature exceeds 1000° C., a lithium transition metal composite oxide having a porosity of less than 5% is obtained. In Examples 1 to 4 which satisfy the production conditions of the present invention and in which the porosity of the lithium transition metal composite oxide is in the range of 5 to 15%, it is found that the energy efficiency and the discharge capacity are larger than Comparative Examples 1 to 4.

In Examples 5 and 6 and Comparative Examples 5 to 7 and 16, in the production of the transition metal hydroxide precursor, the pH of the reaction tank is 10.0, 10.2, 10.5, 10.7, 11.0, and 9.0, respectively, with respect to 9.8 in Example 1. In Comparative Example 8, the pH of the reaction tank is 11.0, and the firing temperature is 650° C. In Examples 5 and 6, the precursor contains the α-type and β-type crystal phases, and the lithium transition metal composite oxide prepared using this precursor has a porosity of 15% or less.

The precursor according to Comparative Examples 5 to 8 in which the pH of the reaction tank exceeds 10.2 is a β-type single phase, and the lithium transition metal composite oxide prepared using this precursor has a porosity of more than 15%. In Comparative Examples 5 to 8, it is found that the energy efficiency and the discharge capacity do not exceed Examples 1 to 6.

The precursor according to Comparative Example 16 in which the pH of the reaction tank is 9.0 is an a-type single phase, and the lithium transition metal composite oxide prepared using this precursor has a porosity of more than 15%. In Comparative Example 16, it is found that the energy efficiency and the discharge capacity do not exceed Examples 1 to 6.

In Comparative Example 9, in which the precursor was a transition metal carbonate, the porosity of the lithium transition metal composite oxide greatly exceeded 15%. It is considered that a gas such as carbon dioxide was generated during the firing process, and a large number of pores were generated in the positive active material, so that the porosity increased. In Comparative Example 9, the discharge capacity is large; however, the energy efficiency is low as compared with the positive active materials of Examples 1 to 6 using a transition metal hydroxide precursor and having a porosity of 15% or less.

In Comparative Example 10 in which the precursor is produced by a solid phase method, the lithium transition metal composite oxide has a porosity of more than 15%. As compared with the positive active materials of Examples 1 to 6 having a porosity of 15% or less, the energy efficiency is low, and the discharge capacity is small.

Next, Examples and Comparative Examples in which the composition and/or production conditions of the lithium transition metal composite oxide are changed are described.

Example 7

A lithium transition metal composite oxide according to Example 7 was prepared in the same manner as in Example 1, except that the composition of a transition metal hydroxide precursor was adjusted to 40 5:55 in the molar ratio of Ni:Co:Mn, and the molar ratio of Li:(Ni, Co, Mn) of a mixed powder of the transition metal hydroxide precursor and a lithium compound was adjusted to 110:100.

Example 8

A lithium transition metal composite oxide according to Example 8 was prepared in the same manner as in Example 1, except that the composition of a transition metal hydroxide precursor was adjusted to 45 5:50 in the molar ratio of Ni:Co:Mn, the pH of a reaction tank was 10.0 in the production of the transition metal hydroxide precursor, the molar ratio of Li:(Ni, Co, Mn) of a mixed powder of the transition metal hydroxide precursor and a lithium compound was adjusted to 110:100, and the mixed powder was fired at 850° C.

Examples 9 to 19

Lithium transition metal composite oxides according to Examples 9 to 19 were prepared in the same manner as in Example 1, except that the molar ratio of Ni:Co:Mn of a transition metal hydroxide precursor, the pH of a reaction tank, the molar ratio Li/Me of a transition metal of the precursor and a lithium compound, and the firing temperature of the precursor and the lithium compound were changed to the conditions shown in Table 2 below.

Comparative Example 11

A lithium transition metal composite oxide according to Comparative Example 11 was prepared in the same manner as in Example 1, except that the molar ratio Li/Me of a mixed powder of a transition metal hydroxide precursor and a lithium compound was adjusted to 1.0.

Comparative Examples 12 and 13

Lithium transition metal composite oxides according to Comparative Examples 12 and 13 were prepared in the same manner as in Example 1, except that the composition of a transition metal hydroxide precursor was adjusted to 33:33:33 (1:1:1) in the molar ratio of Ni:Co:Mn, the pH of a reaction tank was 10.0, and the molar ratio Li/Me of the transition metal hydroxide precursor and a lithium compound was 1.0 or 1.1, and firing was performed at 900° C.

Comparative Example 14

A lithium transition metal composite oxide according to Comparative Example 14 was prepared in the same manner as in Example 1, except that the molar ratio Li/Me of a mixed powder of a transition metal hydroxide precursor and a lithium compound was adjusted to 1.45.

Comparative Example 15

A lithium transition metal composite oxide according to Comparative Example 15 was prepared in the same manner as in Comparative Example 10, except that mixing was performed so that the molar ratio of Li:Ni:Co Mn was 145:30:15:55.

Table 2 below shows results of a charge-discharge test of nonaqueous electrolyte secondary batteries using the lithium transition metal composite oxides according to the above Examples and Comparative Examples for the positive active materials.

TABLE 2

| | Transition metal composition Ni/Co/Mn [mol %] | Li/Me ratio [Molar ratio] | Firing temperature [° C.] | pH of reaction tank | Crystal phase of precursor | Composite oxide porosity [%] | Energy efficiency [%] | Discharge capacity [m Ah/g] |
|---|---|---|---|---|---|---|---|---|
| Example 7 | 40/5/55 | 1.1 | 800 | 9.8 | $\alpha Me(OH)_2 + \beta Me(OH)_2$ | 8.5 | 96 | 212 |
| Example 8 | 45/5/50 | 1.1 | 850 | 10.0 | $\alpha Me(OH)_2 + \beta Me(OH)_2$ | 12.8 | 97 | 213 |
| Example 9 | 50/5/45 | 1.2 | 900 | 10.0 | $\alpha Me(OH)_2 + \beta Me(OH)_2$ | 10.2 | 97 | 214 |
| Example 10 | 55/5/40 | 1.3 | 850 | 10.0 | $\alpha Me(OH)_2 + \beta Me(OH)_2$ | 11.5 | 95 | 212 |
| Example 11 | 45/0/55 | 1.3 | 900 | 10.0 | $\alpha Me(OH)_2 + \beta Me(OH)_2$ | 9.1 | 96 | 217 |
| Example 12 | 35/15/50 | 1.3 | 800 | 10.0 | $\alpha Me(OH)_2 + \beta Me(OH)_2$ | 13.3 | 95 | 216 |
| Example 13 | 40/15/45 | 1.3 | 800 | 10.0 | $\alpha Me(OH)_2 + \beta Me(OH)_2$ | 13.5 | 95 | 214 |
| Example 14 | 45/15/40 | 1.2 | 800 | 10.0 | $\alpha Me(OH)_2 + \beta Me(OH)_2$ | 13.1 | 97 | 212 |
| Example 15 | 45/15/40 | 1.3 | 800 | 10.0 | $\alpha Me(OH)_2 + \beta Me(OH)_2$ | 13.6 | 95 | 214 |
| Example 16 | 45/15/40 | 1.2 | 850 | 10.0 | $\alpha Me(OH)_2 + \beta Me(OH)_2$ | 11.6 | 96 | 215 |
| Example 17 | 45/15/40 | 1.2 | 900 | 10.0 | $\alpha Me(OH)_2 + \beta Me(OH)_2$ | 9.3 | 97 | 216 |
| Example 18 | 30/15/55 | 1.35 | 800 | 9.8 | $\alpha Me(OH)_2 + \beta Me(OH)_2$ | 6.7 | 96 | 215 |
| Example 19 | 30/15/55 | 1.4 | 800 | 9.8 | $\alpha Me(OH)_2 + \beta Me(OH)_2$ | 5.2 | 95 | 213 |
| Comparative Example 11 | 30/15/55 | 1.0 | 800 | 9.8 | $\alpha Me(OH)_2 + \beta Me(OH)_2$ | 15.4 | 87 | 162 |
| Comparative Example 12 | 33/33/33 | 1.0 | 900 | 10.0 | $\alpha Me(OH)_2 + \beta Me(OH)_2$ | 3.6 | 99 | 178 |
| Comparative Example 13 | 33/33/33 | 1.1 | 900 | 10.0 | $\alpha Me(OH)_2 + \beta Me(OH)_2$ | 3.1 | 98 | 179 |
| Comparative Example 14 | 30/15/55 | 1.45 | 800 | 9.8 | $\alpha Me(OH)_2 + \beta Me(OH)_2$ | 3.7 | 88 | 194 |
| Comparative Example 15 | 30/15/55 | 1.45 | 800 | (Solid phase method) | — | 3.9 | 88 | 162 |

According to Examples 7 to 19, in the production of the transition metal hydroxide precursor, the hydroxide precursor containing $\alpha Me(OH)_2$ and $\beta Me(OH)_2$ is produced by setting the pH of the reaction tank to 10.2 or less, the precursor and the lithium compound are mixed so that the molar ratio Li/Me of Li to Me is 1.1 to 1.4, and the lithium transition metal composite oxide obtained by firing at a temperature of 1000° C. or lower has a porosity in the range of 5 to 15%. It is found that a battery using this lithium transition metal composite oxide for the positive active material has high energy efficiency and large discharge capacity.

The lithium transition metal composite oxide according to Comparative Example 11 does not satisfy the composition range of the present invention in that the molar ratio Li/Me is 1 (the oxide is not of a lithium excess type). Despite the same production conditions as in Example 1, the porosity of the lithium transition metal composite oxide exceeds 15%, and a battery using this lithium transition metal composite oxide for the positive active material has low energy efficiency and small discharge capacity.

In the lithium transition metal composite oxide according to Comparative Example 13, although Li/Me is 1.1, Mn/Me is less than 0.4 and is 0.33. The porosity of the lithium transition metal composite oxide according to Comparative Example 13 is less than 5%, and although the energy efficiency is high, the discharge capacity is small.

The lithium transition metal composite oxide according to Comparative Example 12 is an example of a $LiMeO_2$-type active material in which Ni:Co:Mn is 1:1:1 and Li/Me is 1. The porosity of the lithium transition metal composite oxide according to Comparative Example 12 is less than 5%, and although the energy efficiency is high, the discharge capacity is small.

The lithium transition metal composite oxide according to Comparative Example 14 does not satisfy the composition range of the present invention in that the molar ratio Li/Me is 1.45. Despite the same production conditions as in Example 1, the porosity of the lithium transition metal composite oxide is less than 5%. In a battery using this lithium transition metal composite oxide for the positive active material, as compared with batteries using the lithium transition metal composite oxides of Examples 7 to 19 having a porosity of 5% or more for the positive active material, the energy efficiency is low, and the discharge capacity is small.

The lithium transition metal composite oxide according to Comparative Example 15 is a lithium transition metal composite oxide having a molar ratio Li/Me of 1.45 prepared by the same solid phase method as in Patent Document 1. In a battery using this lithium transition metal composite oxide for the positive active material, the energy efficiency is low, and the discharge capacity is small.

Figure 3:
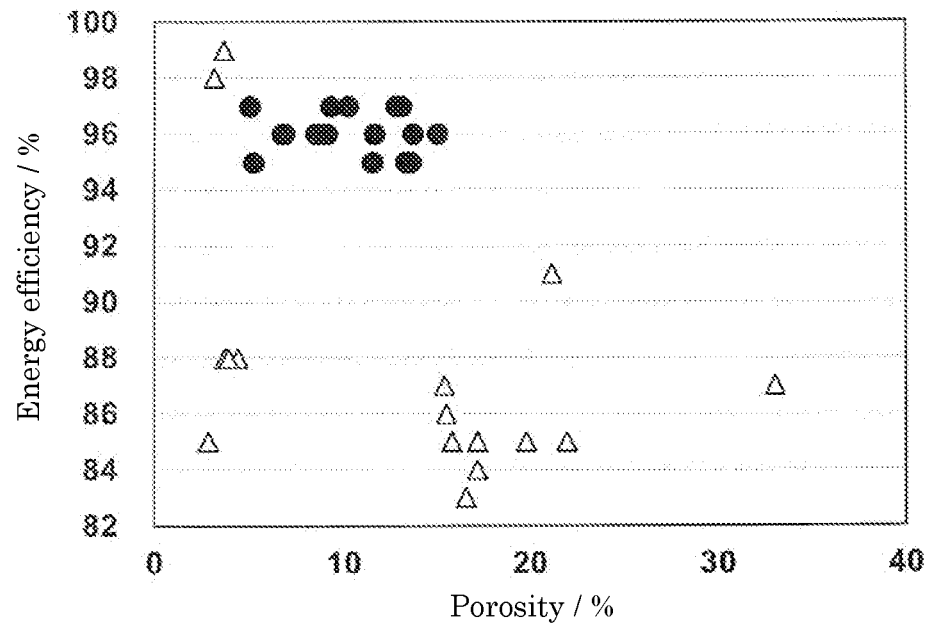
FIG. 3 is a view showing a relationship between porosity and energy efficiency of a lithium transition metal composite oxide.
Figure 4:
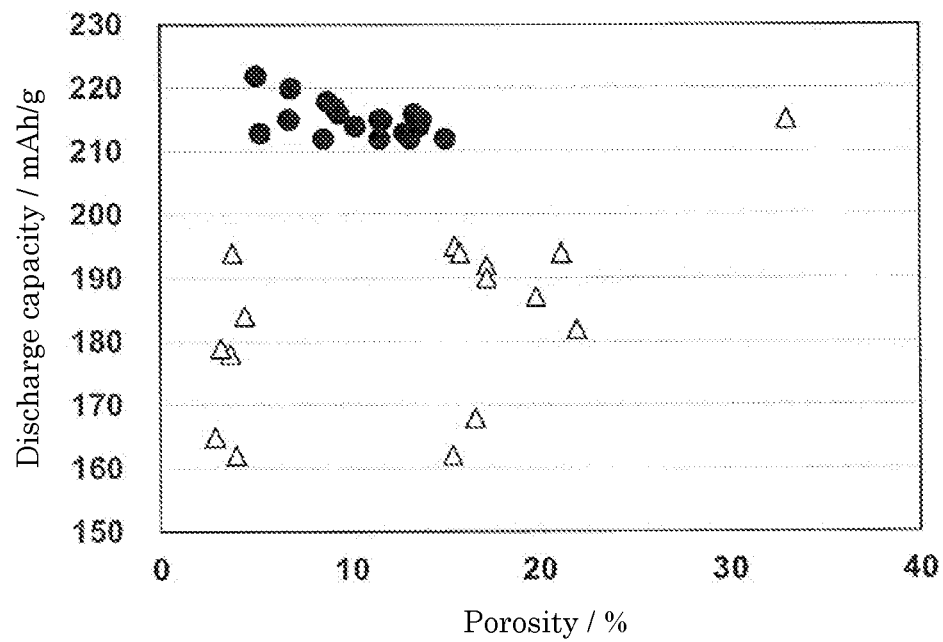
FIG. 4 is a view showing a relationship between the porosity and discharge capacity of the lithium transition metal composite oxide.

For the above Examples and Comparative Examples, a relationship between the porosity of the lithium transition metal composite oxide and the energy efficiency of the battery using this lithium transition metal composite oxide for the positive active material is shown in FIG. 3, and a relationship between the porosity of the lithium transition metal composite oxide and the discharge capacity of the battery using this lithium transition metal composite oxide for the positive active material is shown in FIG. 4. In each of the figures, solid black circles (●) represent Examples, and white triangles (Δ) represent Comparative Examples.

As seen from FIGS. 3 and 4, in a battery using the lithium transition metal composite oxide, which has a molar ratio Li/Me of Li and the transition metal (Me) of 1.05≤Li/Me≤1.4 and a porosity of 5 to 15%, for the positive active material, it is found that as compared with a battery using the lithium transition metal composite oxide, having a porosity of less than 5% and more than 15%, for the positive active material, high energy efficiency and a large discharge capacity are simultaneously achieved.

As shown in FIG. 4, the nonaqueous electrolyte secondary battery according to the third embodiment has lithium metal as a counter electrode, and when the battery is charged up to 4.45 V (vs. $Li/Li^+$) after being subjected to charge and discharge processes up to termination of a region where the potential change relative to the amount of charge is relatively flat and which is observed in a positive potential range of 4.5 to 5.0 V (vs. Li/Li$^+$), a dischargeable electric amount (discharge capacity) is 200 mAh/g or more. The discharge capacity is preferably 210 mAh/g or more.

INDUSTRIAL APPLICABILITY

By using the positive active material containing the lithium transition metal composite oxide according to the present invention, it is possible to provide a nonaqueous electrolyte secondary battery having high energy efficiency and a large discharge capacity. Accordingly, this nonaqueous electrolyte secondary battery is useful as a nonaqueous electrolyte secondary battery for hybrid vehicles, electric vehicles, plug-in hybrid vehicles, and the like.

DESCRIPTION OF REFERENCE SIGNS

1: Nonaqueous electrolyte secondary battery
2: Electrode group
3: Battery case
4: Positive electrode terminal
4': Positive electrode lead
5: Negative electrode terminal
5': Negative electrode lead
20: Energy storage unit
30: Energy storage apparatus

The invention claimed is:

1. A positive active material for a nonaqueous electrolyte secondary battery containing a lithium transition metal composite oxide,
wherein
the lithium transition metal composite oxide has an α-NaFeO$_2$ structure,
a molar ratio Li/Me of Li and a transition metal (Me) of $1.05 \leq Li/Me \leq 1.4$,
a porosity of 5 to 15%,
the lithium transition metal composite oxide contains Ni and Mn or Ni, Co, and Mn as the transition metal (Me),
a molar ratio Mn/Me of Mn to the transition metal element Me is 0.35 or more and less than 0.6, and
the lithium transition metal composite oxide is made by
coprecipitating a compound containing Ni and Mn, or Ni, Co, and Mn in a solution of pH of 9.8 to 10.2 to make a transition metal hydroxide precursor, wherein the transition metal hydroxide precursor is a mixture of αMe(OH)$_2$ and βMe(OH)$_2$, and
firing a mixture of a lithium compound and the transition metal hydroxide precursor at 750 to 1000° C.

2. The positive active material for a nonaqueous electrolyte secondary battery according to claim 1, wherein using lithium metal as a counter electrode,
(i) charge and discharge in which an end-of-charge voltage is 4.6 V and an end-of-discharge voltage is 2.0 V, and
(ii) charge and discharge in which the end-of-charge voltage is 4.45 V and the end-of-discharge voltage is 2.0 V are performed in this order, and
an electric amount is 200 mAh/g or more in the discharge of (ii).

3. A method of producing a positive active material for a nonaqueous electrolyte secondary battery containing a lithium transition metal composite oxide, comprising
coprecipitating a compound containing Ni and Mn, or Ni, Co, and Mn in a solution of pH of 9.8 to 10.2 to make a transition metal hydroxide precursor, and
mixing a lithium compound with the transition metal hydroxide precursor and firing the mixture at 750 to 1000° C. to prepare the lithium transition metal composite oxide having an α-NaFeO$_2$ structure, a molar ratio Li/Me of Li and a transition metal (Me) of $1.05 \leq Li/Me \leq 1.4$, and a porosity of 5 to 15%,
wherein the transition metal hydroxide precursor contains Ni and Mn or Ni, Co, and Mn as the transition metal (Me) and is a mixture of αMe(OH)$_2$ and βMe(OH)$_2$, and
a molar ratio Mn/Me of Mn to the transition metal element Me is 0.35 or more and less than 0.6.

4. A positive electrode for a nonaqueous electrolyte secondary battery containing the positive active material according to claim 1.

5. A nonaqueous electrolyte secondary battery comprising the positive electrode for a nonaqueous electrolyte secondary battery according to claim 4.

* * * * *